US007946534B2

(12) United States Patent
Simon et al.

(10) Patent No.: US 7,946,534 B2
(45) Date of Patent: May 24, 2011

(54) PRESSURE VESSEL HAVING CONTINUOUS SIDEWALL

(75) Inventors: Xavier D. Simon, Aliso Viejo, CA (US); Victor J. Barackman, Chula Vista, CA (US)

(73) Assignee: The Boeing Company, Chicago, IL (US)

(*) Notice: Subject to any disclaimer, the term of this patent is extended or adjusted under 35 U.S.C. 154(b) by 425 days.

(21) Appl. No.: 11/923,284

(22) Filed: Oct. 24, 2007

(65) Prior Publication Data

US 2009/0108137 A1      Apr. 30, 2009

(51) Int. Cl.
*B64G 1/64* (2006.01)
(52) U.S. Cl. .................. 244/171.7; 244/158.1
(58) Field of Classification Search ............ 244/158.1, 244/172.4, 171.1, 173.1–3, 171.7, 159.1; 220/560.07, 560.09, 560.11, 581, 582, 651–3
See application file for complete search history.

(56) References Cited

U.S. PATENT DOCUMENTS

| | | | | |
|---|---|---|---|---|
| 3,199,712 A | * | 8/1965 | Narklewicz | 220/581 |
| 3,508,677 A | * | 4/1970 | Laibson et al. | 220/590 |
| 4,789,118 A | * | 12/1988 | Byers | 244/173.1 |
| 6,354,451 B1 | * | 3/2002 | Holst | 220/1.5 |
| 6,386,384 B1 | * | 5/2002 | Chohfi et al. | 220/23.91 |

OTHER PUBLICATIONS

Apollo Operations Handbook Block II Spacecraft: vol. I. SM2A-03-Block II-(1). Oct. 15, 1969. pp. 1-3 to 1-50, 2.9-38 to 2.9-42.*
NASA Apollo Command Module News Reference. 1968.*
"Moon Landing". Flight International. Feb. 6, 1969. pp. 208-218.*
http://www.nasa.gov/mission_pages/constellation/multimedia/orion_contract_images.html.
http://www.nasa.gov/images/content/176609main_jsc2007e20979_lores.jpg.
http://www.nasa.gov/mission_pages/constellation/orion/index.html.
http://www.russianspaceweb.com/soyuz.html
NASA Apollo Command Module New Reference. NASA Apollo Program Historical Information. pp. 0041-0060.
http://www.nasa.gov/mission_pages/constellation/multimedia/orion_contract_images.html, retrieved Mar. 31, 2011.
http://www.nasa.gov/images/content/176609main_jsc2007e20979_lores.jpg, retrieved Mar. 31, 2011.
http://www.nasa.gov/mission_pages/constellation/orion/index.html, retrieved Mar. 31, 2011.
http://www.russianspaceweb.com/soyuz.html, retrieved Mar. 31, 2011.
NASA Apollo Command Module New Reference. NASA Apollo Program Historical Information. pp. 0041-0060, retrieved Mar. 31, 2011.

* cited by examiner

*Primary Examiner* — Timothy D Collins
*Assistant Examiner* — Michael Kreiner
(74) *Attorney, Agent, or Firm* — Weiss & Moy, P.C.

(57) ABSTRACT

A spacecraft pressure vessel has a tub member. A sidewall member is coupled to the tub member so that a bottom section of the sidewall member extends from an attachment intersection with the tub member and away from the tub member. The bottom section of the sidewall member receives and transfers a load through the sidewall member.

20 Claims, 5 Drawing Sheets

PRESSURE VESSEL HAVING CONTINUOUS SIDEWALL

This invention was made with Government support under contract number NNJ05HF17C awarded by NASA.

BACKGROUND

Embodiments of this disclosure relate generally to a pressure vessel, and more particularly, to continuous sidewall pressure vessel for use as a spacecraft structure that allows for the transfer of loads to the outboard sidewalls.

In a typical spacecraft such as those used in Apollo program, the spacecraft was made up of multiple units or stages that worked together to perform the desired mission. The main components of the spacecraft were, from top to bottom, the launch escape system, the crew/command module, the service module, the lunar module, and the lunar module adapter. These stages together would sit atop a launch vehicle.

The crew/command module was the control center for the spacecraft and living quarters for the crew. It generally contains the pressurized main crew cabin and the control and instrument panels. The crew/command module is structurally joined to the service module. The service module is a portion of the spacecraft that was unpressurized and contained fuel cells, batteries, high gain antenna, radiators, water, oxygen, hydrogen, reaction control system and propellant to enter and leave lunar orbit, and service the propulsion systems. The service module is structurally joined to a launch vehicle via an adapter.

Due to packaging and geometry constraints, the typical crew/command module places a large volume of equipment on the outer perimeter, near the maximum diameter of the crew/command module. The launch vehicle and service module must transmit loads to the crew/command module by pushing on some part of the crew/command module structure, and may transmit loads either near the perimeter or more near the center. A basic problem of typical spacecraft configuration is that once the equipment is located near the perimeter, the structure for load transfer, compression pads, must be relocated more near the center of the crew/command module. When the compression pads are offset closer to the center of the crew/command module, then the primary load pathway follows a zig-zag pattern which is less efficient. The zig-zag patterns are necessary to avoid direct load transfers onto the equipment. This is necessary since the equipment may be damaged by direct load transfers.

Therefore, it would be desirable to provide an apparatus and method that overcomes the above problems. The apparatus and method allows the launch vehicle to transmit loads near the perimeter of the crew/command module, while equipment is concurrently located near the perimeter of the crew/command module.

SUMMARY

A spacecraft pressure vessel has a tub member. A sidewall member is coupled to the tub member so that a bottom section of the sidewall member extends from an attachment intersection with the tub member and away from the tub member. The bottom section of the sidewall member receives and transfers a load through the sidewall member.

A spacecraft pressure vessel has a tub member. A sidewall member is coupled to the tub member to close the pressure vessel. A bottom section of the sidewall member extends from an attachment intersection with the tub member and away from the tub member and terminates at a position approximately parallel with a bottom section of the tub member. The bottom section receives and transfers a load through the sidewall member. A plurality of compression pads is coupled to the bottom section of the sidewall member. The compression pads receive and transfer the load to the sidewall member.

A method for improving structural stability of a launch vehicle of a spacecraft comprises: providing pressure vessel having a sidewall member coupled to a tub unit, wherein a bottom section of the sidewall member extends from an attachment intersection with the tub unit and away from the body unit and terminates at a position approximately parallel with a bottom section of the body unit; providing a propulsion stage vehicle; and attaching the pressure vessel to the propulsion stage vehicle so the bottom section of the sidewall member receives and transfers a load through sidewall member.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
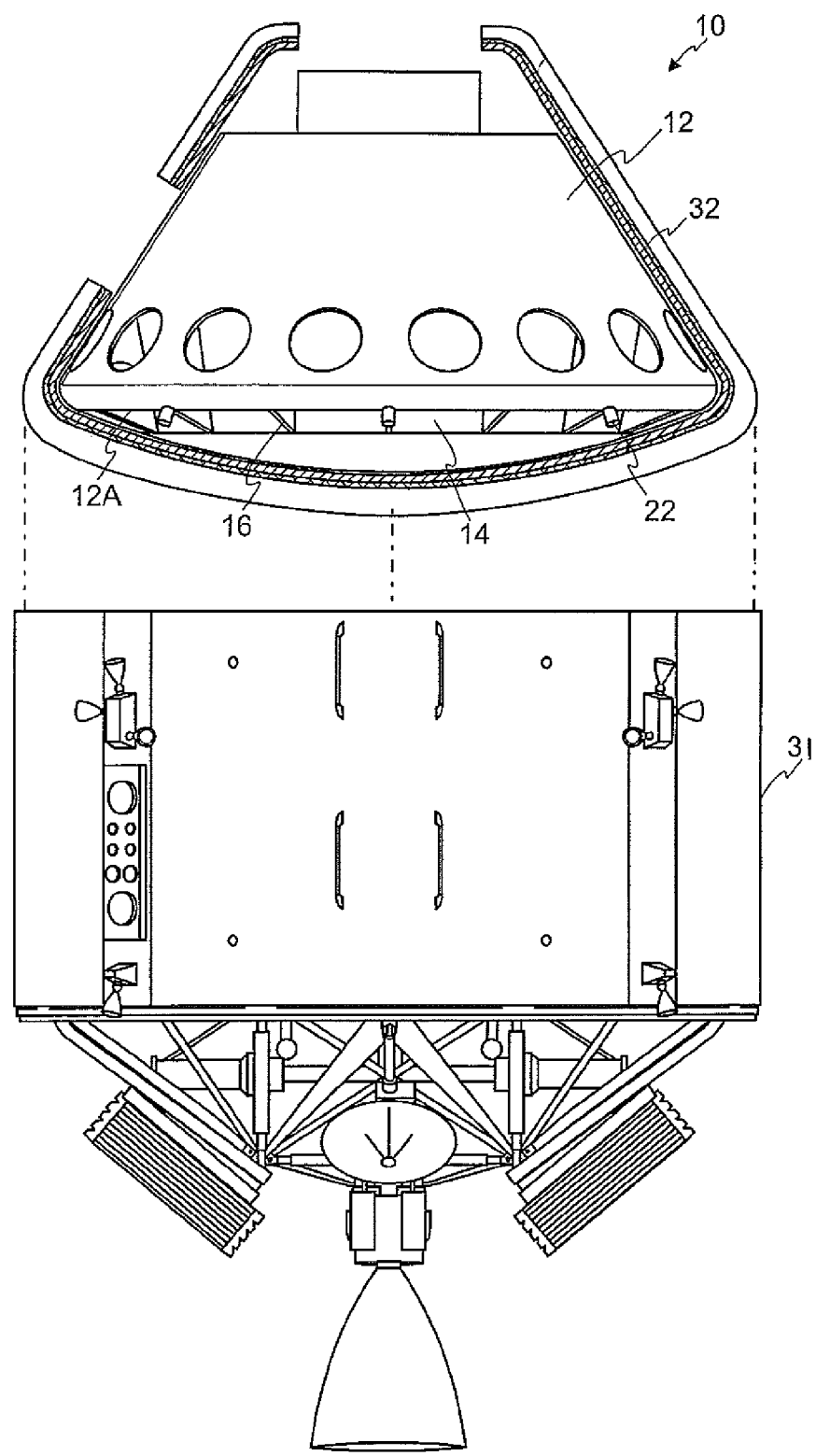
FIG. 1 is an exploded perspective view of one embodiment of a vessel having a continuous sidewall and a propulsion vehicle.

With reference now to the FIGS. 1-3, a pressure vessel 10 (hereinafter vessel 10) is shown. The vessel 10 allows for load transfer locations to be positioned towards the perimeter of the vessel 10. By having the load transfer locations along the perimeter of the vessel 10, the vessel 10 will have a more efficient load pathway, a lighter and more efficient structure, and allows for options on systems configuration currently not possible.

The vessel 10 is generally comprised of: a sidewall structure 12, a tub element 14, and a plurality of stiffener devices 16. The tub element 14 is shaped as an open container vessel. In the embodiment depicted in FIGS. 1-3, the tub element 14 is shaped as an open rounded container. However, this is just one embodiment and should not be seen as to limit the scope. The tub element 14 may take on other geometric shapes without departing from the spirit and scope. The tub element 14 includes a floor section 18 and a wall 20 which extends up and away from the floor section 18. The tub element 14 may be made out of a variety of different materials. In general, a lightweight but sturdy material is used. For example, a light weight metal such as aluminum may be used. Alternatively, a composite fiber material may be used. A layered structure may also be used. Thus, the tub element 14 may be formed of a layered structure comprising an aluminum inner skin, a thermally bonded honeycomb core, and a thin aluminum face sheet. The listing of the above is given as an example and should not be seen as to limit the scope. Other materials may be used without departing from the spirit and scope.

A plurality of stiffener devices 16 are coupled to the tub element 14. The stiffener devices 16 are coupled around the outer perimeter of the tub element 14. Each stiffener device 16 is coupled to an exterior surface of the wall 20. The stiffener devices 16 are used to maintain the shape of the sidewall structure 12 and generally will carry a minimal load. In general, the stiffener devices 16 are made from the same material as the tub element 14. Thus, a lightweight but sturdy material is used. However, a different material may be used without departing from the spirit and scope. In the embodiment depicted in FIG. 1-3, the stiffener devices 16 are triangular in shape. However, the stiffener device 16 may take on other geometric shapes without departing from the spirit and scope.

Figure 4:
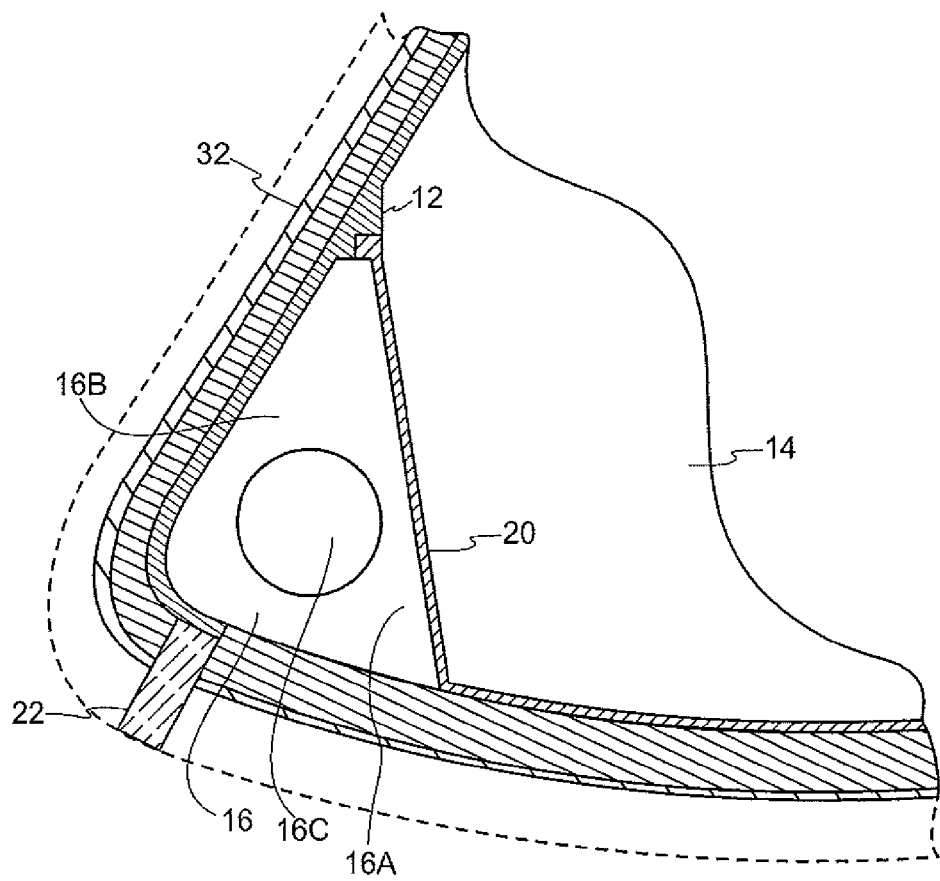
FIG. 4 is a magnified view of showing the relation between the stiffeners, tub element and the sidewall.

As shown more clearly in FIG. 4, a first edge 16A of each stiffener device 16 is generally coupled to the exterior surface of the wall 20. A second edge 16B of the stiffener device 16 will angle away from the tub element 14. The second edge 16B is coupled to the sidewall structure 12. Thus, the angle of the second edge 16B will conform to the shape of the sidewall structure 12 and will maintain the shape of the sidewall structure 12. Also of note in FIG. 4 is the detail of the joint between the tub wall 20 and sidewall structure 12, as this joint provides a seal between the two main components of the pressure vessel. Different welding processes, such as friction-stir welding, may be used to join the structural elements in the required manner.

Referring back to FIGS. 1-3, the stiffener device 16 may have a section 16C removed from a surface thereof. In the embodiment depicted in FIGS. 1-3, a circular aperture has been formed through the surface of the stiffener device 16. While a circular shape is shown, other geometric shapes may be formed through the surface of the stiffener device 16 without departing from the spirit and scope. The section 16C has been removed to lighten the overall weight of the vessel 10.

A sidewall structure 12 is then coupled to the tub element 14 and the plurality of stiffener devices 16. The sidewall structure 12 is a continuous sidewall and fits over the tub element 14 so that a top edge of the wall 20 is attached to an interior surface of the sidewall structure 12 to form an attachment intersection. The sidewall structure 12 extends down from the attachment intersection with the tub element 14 and away from the tub element 14 and terminates at a position approximately parallel with a bottom section of the tub element 14. A lower section of the sidewall structure 12 is attached to each of the stiffener devices 16. In the embodiment depicted in FIGS. 1-3, the lower section of the sidewall structure 12 is attached to the second edge 16B of the sidewall structure 16. Different welding processes, such as friction-stir welding, may be used to attach the sidewall structure 12 to the tub element 14. Various welding or attachment processes may also be used to attach the plurality of stiffener devices 16 to the sidewall structure 12 and tub element 14. In general, the sidewall structure 12 is made from the same material as the tub element 14 and the stiffener devices 16. Thus, a lightweight but sturdy material is used. However, different materials may be used without departing from the spirit and scope.

Figure 2:
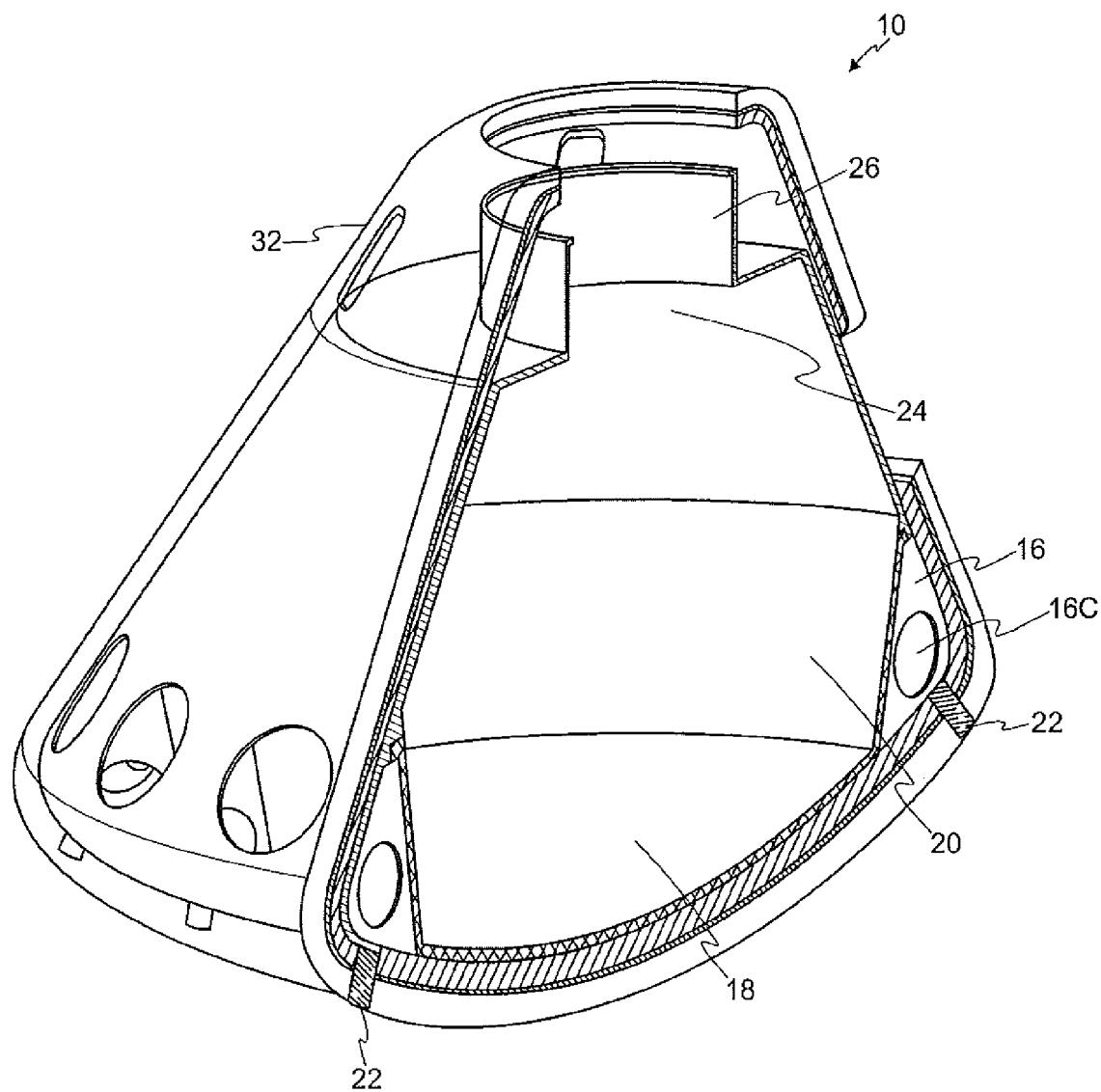
FIG. 2 is a cross-sectional view of the vessel of FIG. 1.
Figure 3:
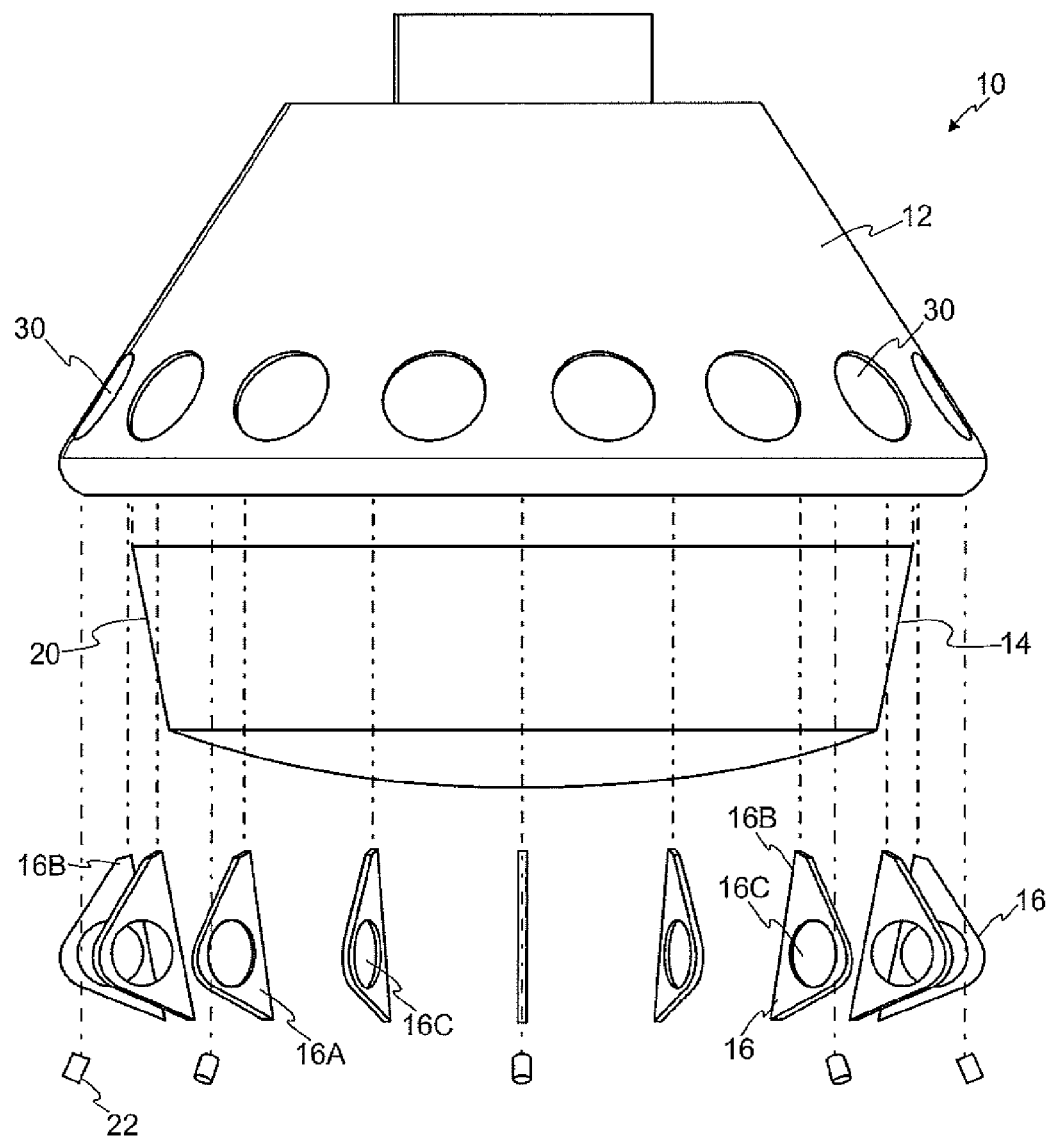
FIG. 3 is an exploded view of the vessel of FIG. 1 with the thermal protection layer removed.

As shown in FIGS. 1-3, the sidewall structure 12 is conical in shape. An opening 24 may be formed in a top section of the sidewall structure 12. The opening 24 will have a tubular member 26 extending from the outer perimeter of the opening 24. The tubular member 26 is a docking tunnel to allow the vessel 10 to dock with other vessels and maintain a pressure-tight seal. A forward hatch is generally mounted at a top section of the tubular member 26. A second opening is generally formed on a side surface of the sidewall structure 12. The second opening is used to mount a side hatch to the sidewall structure 12.

A plurality of cut-outs 30 may be formed through a bottom area of the sidewall structure 12. The cut-outs 30 are used to decrease the weight of the vessel 10. In FIGS. 1-3, the cut-outs 30 are circular in shape. However, this is only given as an example. The cut-outs may take on other configurations without departing from departing from the spirit and scope.

A plurality of compression pads 22 is attached to the vessel 10. Individual compression pads 22 are coupled to a bottom surface 12A of the sidewall structure 12 around an outer perimeter of the vessel 10. The number of compression pads 22 is generally related to the number of devices used to secure the vessel 10 to the service module 31. In general, one compression pad 22 may be used with each docking assembly used to secure the vessel 10 to the service module 31. The compression pads 22 push against an adapter ring in the service module 31. As the compression pads 22 push against the adapter ring, the docking assembly reacts to that force, and a preload is generated to secure the adapter ring. This preload is needed to provide a stiff loading path between the vessel 10 and the service module 31. The configuration described above is but one example of an embodiment of a spacecraft assembly.

By having the compression pads 22 coupled to the sidewall structure 12, the load from the launch vehicle is transferred through the sidewall structure 12 and thus to the perimeter of the vessel 10. The sidewall structure 12 connects the load transfer point to the vessel 10 in one single structural element while the vessel equipment is concurrently located near the perimeter of the vessel 10. This allows for efficient transfer of loads from the launch vehicle into the vessel 10.

An insulative layer 34 is attached to an exterior surface of the vessel 10. The insulative layer 34 is generally attached to the sidewall structure 12, exposed surfaces of the tub element 14, and exposed surfaces of the stiffener devices 16. The insulative layer 34 is used to protect the vessel 10 and those in the vessel 10 from the heat and cold of space while in orbit. An outer shell 32 is then attached to an exterior surface of the insulative layer 34. A thermal protective layer 36 is attached to an exterior surface of the outer shell 32 of the vessel 10. The thermal protection layer 36 is used to protect the vessel 10 from the heat during atmospheric reentry. The thermal protection layer 36 also protects the vessel 10 from the heat and cold of space while on orbit. The thermal protection layer 36 may be an ablative heat shield which burns off during reentry or a reusable thermal protection system similar to that employed by the Space Shuttle Different materials may be used for the thermal protection layer 36. The location and the type of materials used along the outer surface of the vessel 10 are based on the amount of heat protection required. The types of material that may be used include, but is not limited to: Reinforced Carbon-Carbon (RCC), used in locations where reentry temperature exceeds 1260° C. (2300° F.); High-temperature Reusable Surface Insulation (HRSI) tiles, used where reentry temperature is below 1260° C.; Fibrous Refractory Composite Insulation Composite Insulation (FRCI) tiles, used to provide improved strength, durability, resistance to coating cracking and weight reduction; Advanced Flexible Reusable Surface Insulation (AFRSI), a quilted, flexible blanket-like surface insulation, used where reentry temperature is below 649° C. (1200° F.); Low-temperature Reusable Surface Insulation (LRSI) tiles, used in temperatures ranges roughly similar to AFRSI; Toughened Unipiece Fibrous Insulation (TUFI) tiles, used in high and low temperature areas; and Felt Reusable Surface Insulation (FRSI), used where temperatures are below 371° C. (700° F.).

Figure 5:
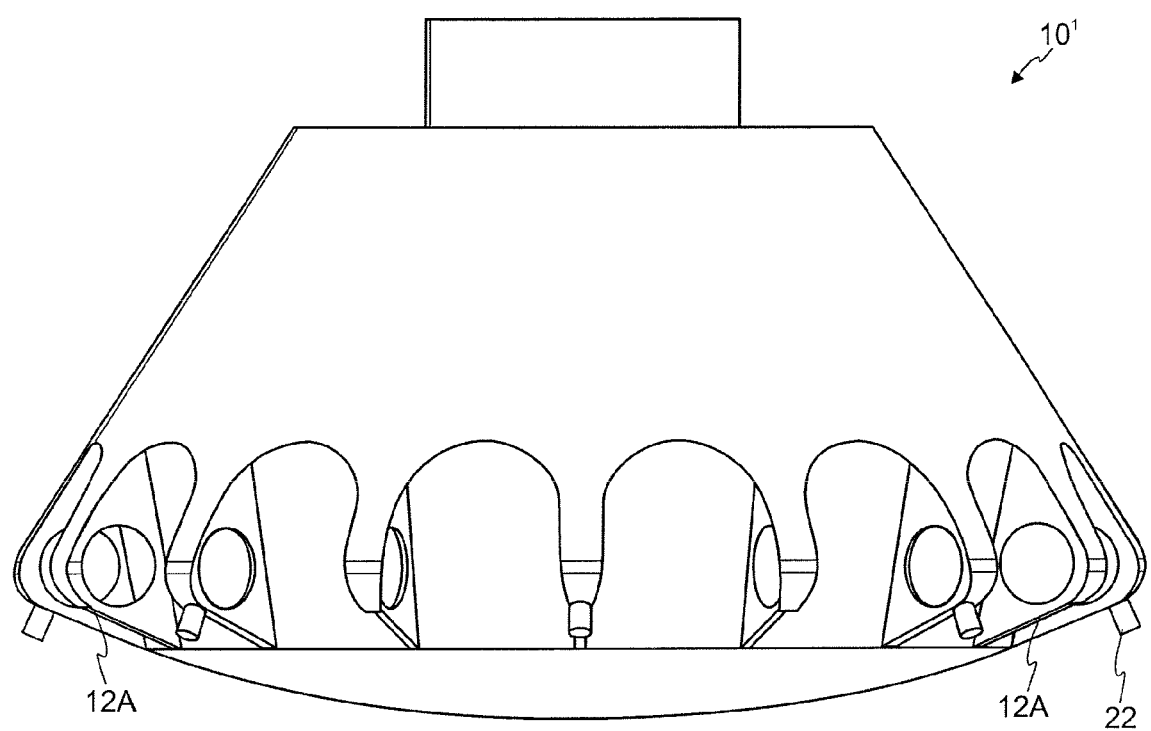
FIG. 5 is a perspective view of another embodiment of the vessel having a continuous sidewall.

Referring now to FIG. 5, another embodiment of the vessel 10A is shown. The vessel 10A is similar to that shown in FIGS. 1-3. However, in the vessel 10A the cut-outs 30 are "U" shaped. The "U" shaped cut-outs are formed through a bottom area of the sidewall structure 12.

The vessel 10 and 10A use a sidewall structure 12 that transfers the load transmitted by the launch vehicle to the perimeter of the vessel 10. The sidewall structure 12 connects the load transfer point to the vessel 10 in one single structural element while the vessel equipment is concurrently located near the perimeter of the vessel 10. This allows for efficient transfer of loads from the launch vehicle into the vessel 10 by allowing a large flange on the pressure vessel to serve as the transfer point for the loads. The sidewall structure 12 provides for a more efficient load path, leads efficient load path, leads to lighter and more efficient vessel 10, and provides an option for systems configuration not current available.

While embodiments of the disclosure have been described in terms of various specific embodiments, those skilled in the art will recognize that the embodiments of the disclosure can be practiced with modifications within the spirit and scope of the claims.

What is claimed is:

1. A spacecraft pressure vessel comprising:
   a tub member;
   a sidewall member coupled to the tub member, a bottom section of the sidewall member extending from the attachment intersection with the tub member and away from the tub member, wherein the bottom section receives and transfers a load through the sidewall member; and
   a plurality of compression pads directly attached to the bottom section of the sidewall member to receive and transfer the load to the sidewall member.

2. A spacecraft pressure vessel in accordance with claim 1 wherein the sidewall member extends down from the attachment intersection with the tub member and away from the tub member and terminates at a position approximately parallel with a bottom section of the tub member.

3. A spacecraft pressure vessel in accordance with claim 1 further comprising a plurality of stiffener devices attached around an outer perimeter of the tub member and to the bottom section of the sidewall member.

4. A spacecraft pressure vessel in accordance with claim 3 wherein each stiffener device has a first edge attached to an outer surface of the tub member around an outer perimeter of the tub member and a second edge extending away from the outer perimeter of the tub member to conform to a shape of the sidewall member.

5. A spacecraft pressure vessel in accordance with claim 3 wherein at least one stiffener device has an opening formed through a surface of the stiffener device.

6. A spacecraft pressure vessel in accordance with claim 3 further comprising:
   an insulative layer attached to an exterior surface of the sidewall member, exposed surfaces of the tub member, and exposed surfaces of the plurality of stiffener devices; and
   an outer shell attached to an exterior surface of the insulative layer.

7. A spacecraft pressure vessel in accordance with claim 1 further comprising a thermal protection layer attached to an exterior surface of the spacecraft.

8. A spacecraft pressure vessel in accordance with claim 1 wherein the bottom surface of the sidewall member has a plurality of openings formed around a perimeter thereof.

9. A spacecraft pressure vessel in accordance with claim 1 wherein the sidewall member is conical in shape.

10. A spacecraft pressure vessel comprising:
    a tub member;
    a sidewall member coupled to the tub member to form a pressure vessel, wherein a bottom section of the sidewall member extends from an attachment intersection with the tub member and away from the tub member and terminates at a position approximately parallel with a bottom section of the tub member, the bottom section receives and transfers a load through the sidewall member; and
    a plurality of compression pads directly attached to the bottom section of the sidewall member to receive and transfer the load through the sidewall member.

11. A spacecraft pressure vessel in accordance with claim 10 further comprising a plurality of stiffener devices attached around an outer perimeter of the tub member and to the bottom section of the sidewall member.

12. A spacecraft pressure vessel in accordance with claim 11 wherein each stiffener device has a first edge attached to an outer surface of the tub member around an outer perimeter of the tub member and a second edge extending away from the outer perimeter of the tub member to conform to a shape of the sidewall member.

13. A spacecraft pressure vessel in accordance with claim 11 wherein at least one stiffener device has an opening formed through a surface of the stiffener device.

14. A spacecraft pressure vessel in accordance with claim 11 further comprising:
    an insulative layer attached to an exterior surface of sidewall member, exposed surfaces of the tub member, and exposed surfaces of the plurality of stiffener devices; and
    an outer shell attached to an exterior surface of the insulative layer.

15. A spacecraft pressure vessel in accordance with claim 10 further comprising a thermal protection layer attached to an exterior surface of spacecraft.

16. A spacecraft pressure vessel in accordance with claim 10 wherein the bottom surface of the sidewall member has a plurality of openings formed through the bottom surface.

17. A method for improving structural stability of a launch vehicle of a spacecraft comprising:
    providing a pressure vessel having a sidewall member coupled to a tub member wherein a bottom section of the sidewall member extends from an attachment intersection with the tub member and away from the tub member and terminates at a position approximately parallel with a bottom section of the tub member;
    directly attaching a plurality of compression pads to the bottom section of the sidewall member;
    providing a propulsion stage vehicle; and
    attaching the pressure vessel to the propulsion stage vehicle so the compression pads receive and transfer a load to the bottom section of the sidewall member and through the sidewall member.

18. The method of claim 17 further comprising forming a plurality of openings in the bottom section of the sidewall member.

19. A spacecraft comprising:
    a tub member; and
    a sidewall member of said spacecraft directly attached to the tub member to form an enclosed structure, a bottom section of the sidewall member extending from an attachment intersection with the tub member and away from the tub member to a bottom section of the tub member, wherein the bottom section receives and transfers a load through the sidewall member.

20. A spacecraft in accordance with claim 19 wherein the sidewall member is a continuous sidewall member, an interior surface of the continuous sidewall member directly attached to the tub member to form the enclosed structure, the bottom section of the sidewall member extending from the attachment intersection with the tub member and away from the tub member to a position approximately parallel with the bottom section of the tub member.

* * * * *